United States Patent
Grein et al.

(10) Patent No.: US 10,174,188 B2
(45) Date of Patent: Jan. 8, 2019

(54) POLYPROPYLENE COMPOSITION

(71) Applicant: SABIC GLOBAL TECHNOLOGIES B.V., Bergen op Zoom (NL)

(72) Inventors: Christelle Marie Hélène Grein, Heel (NL); Koen Batinas-Geurts, Geleen (NL); Rob Donners, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 2 days.

(21) Appl. No.: 15/538,766

(22) PCT Filed: Dec. 21, 2015

(86) PCT No.: PCT/EP2015/080715
§ 371 (c)(1),
(2) Date: Jun. 22, 2017

(87) PCT Pub. No.: WO2016/102422
PCT Pub. Date: Jun. 30, 2016

(65) Prior Publication Data
US 2018/0002515 A1    Jan. 4, 2018

(30) Foreign Application Priority Data
Dec. 22, 2014 (EP) ..................................... 14199669

(51) Int. Cl.
| | | |
|---|---|---|
| *C08L 23/12* | (2006.01) | |
| *C08K 3/34* | (2006.01) | |
| *C08K 7/14* | (2006.01) | |
| *C08L 23/10* | (2006.01) | |
| *C08L 23/16* | (2006.01) | |

(52) U.S. Cl.
CPC ............... *C08L 23/12* (2013.01); *C08K 3/34* (2013.01); *C08K 7/14* (2013.01); *C08L 23/10* (2013.01); *C08L 23/16* (2013.01); *C08L 2203/30* (2013.01); *C08L 2205/02* (2013.01); *C08L 2205/025* (2013.01); *C08L 2207/02* (2013.01)

(58) Field of Classification Search
CPC ........ C08L 23/12; C08L 23/142; C08L 23/10; C08L 23/16; C08K 3/34; C08K 7/14
See application file for complete search history.

(56) References Cited

U.S. PATENT DOCUMENTS

| | | | |
|---|---|---|---|
| 5,082,889 A | | 1/1992 | Koizumi et al. |
| 7,786,204 B2 * | | 8/2010 | Grein .................... C08K 3/0033 524/426 |
| 9,181,423 B2 * | | 11/2015 | Kock ........ C08L 23/14 |
| 10,087,319 B2 * | | 10/2018 | Grein ........ C08L 23/12 |
| 2001/0006990 A1 | | 7/2001 | Jeong et al. |
| 2003/0153449 A1 * | | 8/2003 | Nakagawa ................ C03C 3/19 501/35 |
| 2007/0238828 A1 * | | 10/2007 | Matsuki ................ C08F 297/08 524/584 |
| 2009/0075078 A1 * | | 3/2009 | Yano ........................ B29B 9/14 428/375 |
| 2011/0097577 A1 * | | 4/2011 | Soliman .................... C08K 5/20 428/339 |
| 2017/0313866 A1 * | | 11/2017 | Wang ...................... C08L 23/12 |
| 2017/0349736 A1 * | | 12/2017 | Grein .................... C08L 23/142 |

FOREIGN PATENT DOCUMENTS

| | | |
|---|---|---|
| EP | 2589623 A1 | 5/2013 |
| KR | 20080061077 A | 7/2008 |
| WO | 9001519 A1 | 2/1990 |
| WO | 9924501 A1 | 5/1999 |
| WO | 2006063698 A1 | 6/2006 |

OTHER PUBLICATIONS

"Phyllosilicates". Tulane University, Available on online http://www.tulane.edu/ , Aug. 18, 2015, pp. 1-7 ("NPL 1"). (Year: 2015).*
"Betonite Clay Info." Available on online http://bentoniteclayinfo.com, 2015, pp. 1-2 ("NPL 2"). (Year: 2015).*
"Kaolinite", Virtual Museum of Minerals and Molecules, Available on online http://soils.wisc.edu, Dec. 2, 2010, p. 1 ("NPL 3"). (Year: 2010).*
Chapter 7.2 and Subchapters 7.2.1; 7.2.2 and 7.2.5 to 7.2.7 of "Handbook of polypropylene and polypropylene composites" edited by Harutun G. Karian (1999) (ISBN 0 8247 4064 5); 17 Pages.
International Search Report for International Application No. PCT/EP2015/080715; International Filing Date: Dec. 21, 2015; dated Mar. 30, 2016; 3 Pages.
Machine Translation of WO9001519A1; Date of Publication: Feb. 22, 1990; 8 Pages.
Written Opinion of the International Searching Authority for International Application No. PCT/EP2015/080715; International Filing Date: Dec. 21, 2015; dated Mar. 30, 2016; 7 Pages.
European Search Report for European Application No. 14199669; Date of Completion of Search: Jun. 1, 2015; 4 Pages.
Machine Translation of KR20080061077; Date of Publication: Jul. 2, 2008; 8 Pages.

\* cited by examiner

*Primary Examiner* — Hannah J Pak
(74) *Attorney, Agent, or Firm* — Cantor Colburn LLP

(57) ABSTRACT

The invention is directed to a polypropylene composition, to a three-dimensional article comprising said polypropylene composition, and to the use of said composition for automotive articles. The polypropylene composition of the invention comprises: —40-90% by total weight of the composition of a polymer blend comprising polypropylene having a melt flow index as measured according to ISO 1133 at 230° C. and 2.16 kg of 2.0-100 g/10 min; —5-25% by total weight of the composition of one or more plastomers; —0.5-25% by total weight of the composition of mineral filler selected from the group consisting of phyllosilicates, mica or wollastonite; and —0.2-4% by total weight of the composition of glass fibers having an average fiber diameter in the range of 5-30 μm.

18 Claims, No Drawings

POLYPROPYLENE COMPOSITION

CROSS REFERENCE TO RELATED APPLICATIONS

This application is a 371 of International Application No. PCT/EP2015/080715, filed Dec. 21, 2015, which claims priority to European Application No. 14199669.4 filed Dec. 22, 2014 which are incorporated herein by reference in their entirety.

The invention is directed to a polypropylene composition, to a three-dimensional article comprising said polypropylene composition, and to the use of said composition for automotive articles.

Polypropylene compositions, and especially filled propylene copolymers, find wide application in automotive components and housings or covers for electrical or household appliances, because of their easy processability, low density and favourable cost/performance balance. Standard propylene homopolymer has several deficiencies that prohibit its use in applications that require stiffness, toughness, like automotive parts. Typically, propylene homopolymers are too brittle and have low impact resistance particularly at low temperature. Impact performance can be dramatically improved by blending polypropylene with rubbery materials, during (multi-step) copolymerisation reactions or by separately mixing the components. Such polypropylene compositions are often referred to as propylene (high) impact copolymers or heterophasic polypropylene. These materials typically have a polypropylene homopolymer or copolymer matrix phase and an elastomeric dispersed phase. This elastomeric material is often a propylene copolymer comprising ethylene and/or other higher α-olefins. Thus, the polypropylene matrix contains (finely) dispersed inclusions being not part of the matrix and the inclusions contain the elastomer. The term inclusion indicates that the matrix and the inclusion form different phases within the heterophasic polypropylene copolymer. The inclusions are for instance visible with high resolution microscopy, such as electron microscopy or scanning force microscopy.

The need for polypropylenes with excellent stiffness at high flowability is constantly increasing as down-gauging and light-weighing become more important with the need for saving energy resources. High flowability polypropylenes are typically used in moulding and particularly the automotive business where injection moulding is the preferred conversion process.

A further important parameter is the heat deflection temperature. This is the temperature at which a polymer or plastic sample deforms under a specified load. For injection moulding, the heat deflection temperature is an important parameter, because it is considered safe to remove an injection moulded article from the mould once it is near or below the heat deflection temperature so that deformation of the article will be within acceptable limits after removal. A high heat deflection temperature is a proof of high temperature stability of the material, thereby allowing us in applications which require a good thermomechanic integrity at higher (service) temperature.

Prior investigations have shown that it is challenging to improve the moulding properties of a polypropylene composition by varying the chemical composition without adversely affecting the mechanical properties of the material. For example, WO-A-99/24501 suggests that shrinkages can be reduced, and at the same time the heat deflection temperature can be increased by the inclusion of talc in a polypropylene composition that comprises propylene polymers which have been nucleated with a polymerised vinyl component. The vinyl compound is a strong α-nucleating agent which, as such, in most of the cases increases the shrinkage. Talc is a filler which decreases the shrinkage. The effect of the talc is stronger than the effect of the vinyl component. Nonetheless, the shrinkage of these compositions is higher than that of standard polypropylene containing talc.

WO-A-90/01519 describes a profiled strip made of a thermoplastic moulding material that can be used for window and door frames. For this application, the composition comprises EPDM and EPM rubbers (which are typically cross-linked) and the polypropylene used in the moulding composition has a relatively low melt flow index.

Accordingly, there is a need in the art for polypropylene compositions that have an excellent balance of high temperature mechanical properties, shrinkage and mouldability. Objective of the invention is to address this need in the art and overcome drawbacks in the prior art.

The inventors surprisingly found that this objective can, at least in part, be met by a polypropylene composition that comprises a specific amount and type of glass fibre.

Accordingly, in a first aspect the invention is directed to a polypropylene composition comprising:
40-90% by total weight of the composition of a polymer blend comprising polypropylene having a melt flow index measured according to ISO 1133 at 230° C. and 2.16 kg of 2.0-100 g/10 min;
5-25% by total weight of the composition of one or more plastomers;
0.5-25% by total weight of the composition of mineral filler selected from the group consisting of phyllosilicates, mica or wollastonite; and
0.2-4% by total weight of the composition of glass fibres having an average fibre diameter in the range of 5-30 μm.

The inventors surprisingly found that the polypropylene composition of the invention combines excellent shrinkage properties with a desirable heat deflection temperature, without a significant adverse effect on mechanical properties.

The term "polypropylene" as used in this application is meant to refer to propylene homopolymer or propylene copolymer or a mixture of such propylene homopolymers and propylene copolymers.

The term "plastomer" as used in this application is meant to refer to a class of ethylene/α-olefin copolymers with a density of 0.85-0.91 g/cm$^3$. Plastomers are further characterised by a melt flow index of 0.2-80 g/10 min (190° C., 2.16 kg).

The polypropylene composition of the invention comprises 40-90% by total weight of the composition of a polymer blend comprising polypropylene.

The polymer blend preferably comprises a polypropylene homopolymer matrix (or continuous) phase and an ethylene/α-olefin elastomeric copolymer dispersed (or discrete) phase. These polymer blends are known in the art as heterophasic polypropylene or impact copolymers. Hence, in a preferred embodiment the polymer blend is a heterophasic polypropylene copolymer. These heterophasic polypropylene copolymers are generally prepared in one or more reactors, by polymerisation of propylene in the presence of a catalyst, and subsequent polymerisation of an ethylene/α-olefin mixture, but may also be prepared by blending individual components, as is well-known to the person skilled in the art. The resulting polymeric materials are heterophasic, but their specific morphology usually depends on the preparation method and monomer types and ratios. The morphology of the dispersed phase depends as first approximation on the viscosity ratio between the dispersed phase and the continuous phase and on the $C_3$-content of the dispersed phase.

The polypropylene homopolymer matrix phase in the polymer blend is preferably present in an amount of 95% or less by weight of the polymer blend, more preferably 90% or less, most preferably 85% or less, such as 50-80% by total weight of the polymer blend, preferably 55-75%. This homopolymer part is preferably a propylene homopolymer, but may contain up to 5% by weight of the homopolymer of comonomer, including but not limited to ethylene comonomer. Accordingly, the term "polypropylene homopolymer" as used in this application is meant to refer to a polypropylene that consists substantially, i.e. of 97% or more by weight of the polymer of propylene units, preferably 98% or more, more preferably 99% or more, even more preferably 99.5% or more. In a preferred embodiment, only propylene units in the propylene homopolymer are detectable. The comonomer content can be determined with Fourier Transform infrared spectroscopy.

In case the polypropylene matrix phase comprises a propylene copolymer, it is preferred that the propylene copolymer is a propylene random copolymer.

Where the polypropylene matrix phase comprises a propylene comonomer, the copolymer comprises monomers copolymerisable with propylene, for example comonomers such as ethylene and/or $C_{4-20}$ α-olefins, in particular ethylene and/or $C_{4-10}$ α-olefins, e.g. 1-butene and/or 1-hexene. Preferably, the propylene copolymer (preferably the propylene random copolymer) comprises monomers copolymerisable with propylene from the group consisting of ethylene, 1-butene and 1-hexene. More specifically the propylene copolymer (preferably the propylene random copolymer) comprises, next to propylene, units derivable from ethylene and/or 1-butene. In a preferred embodiment, the propylene copolymer (preferably the propylene random copolymer) consists of units derivable from ethylene and propylene. The comonomer content in the polypropylene matrix is preferably 5.0% or less by total weight of the polypropylene matrix, such as 0.5-5%, or 1-5%, or 1-4%, or 1-3%.

Preferably, the polypropylene matrix phase has a melt flow index as measured under a load of 2.16 kg at 230° C. (ISO 1133) of 0.05-200 g/10 min, more preferably 0.5-150 g/10 min, even more preferably 1.0-120 g/10 min, such as 5.0-100.0 g/10 min, such as 10-100 g/10 min, 10-80 g/10 min, or 15-60 g/10 min.

Preferably the polypropylene matrix phase is isotactic.

For the ethylene/α-olefin copolymer elastomeric dispersed phase, in general every α-olefin monomer having 3-20 carbon atoms is suited, preferably α-olefins monomers having 3-12 carbon atoms are used. More preferably, the α-olefin monomer is selected from the group consisting of propylene, 1-butene, 1-pentene, 1-hexene, 1-heptane and 1-octene. The ethylene/α-olefin copolymer preferably comprises at least units derived from ethylene and propylene and may further comprise units derived from α-olefins mentioned above. However, it is particularly preferred that the ethylene/α-olefin copolymer consists of ethylene and propylene as polymerisable units. Thus, an ethylene/propylene elastomer is most preferred.

The ethylene content in the ethylene/α-olefin copolymer elastomeric dispersed phase may vary widely and can be 10-80% by total weight of the ethylene/α-olefin copolymer, preferably 20-70%, more preferably 30-60%.

Preferably, the ethylene/α-olefin copolymer is not cross-linked.

The ethylene/α-olefin elastomeric copolymer in the polymer blend is preferably present in an amount of 5% or more by weight of the polymer blend, more preferably 10% or more, most preferably 12% or more, such as 15-35% by total weight of the polymer blend, preferably 17-25%.

Optionally, the polymer blend can comprise a crystalline polyethylene as a further component next to the polypropylene homopolymer and the ethylene/α-olefin elastomer. In an embodiment, the polymer blend consists of a polypropylene matrix, an elastomeric copolymer and an optional crystalline polyethylene. The polymer blend may also comprise a mixture of a heterophasic polypropylene copolymer and a polypropylene homopolymer. In another embodiment, the polypropylene composition comprises less than 5% by total weight of the composition of polyethylene, more preferably less than 2%, even more preferably less than 1%. The polypropylene composition may also be substantially free from polyethylene.

The polypropylene polymer can be a polymer made by any known polymerisation technique as well as with any known polymerisation catalyst system. Regarding the techniques, reference can be given to slurry, solution or gas-phase polymerisations; regarding the catalyst system reference can be given to Ziegler-Natta, metallocene, or (other) single-site catalyst systems. All are, in themselves, known in the art.

Preferably, the polypropylene polymer has a melt flow index (MFI), measured according to ISO 1133 at 230° C. and 2.16 kg, of 2.0-80 g/10 min, or 1-60 g/10 min, preferably 2.0-60 g/10 min, more preferably 5.0-60 g/10 min, such as 10-60 g/10 min.

In accordance with the invention, it is further possible that the polymer blend comprises two or more heterophasic polypropylenes as described herein.

The polypropylene composition of the invention can further comprise a modified polypropylene. Such modification may improve the interaction between the polypropylene and the glass fibres. Examples of suitable modified polypropylenes are polypropylenes grafted with for instance an unsaturated organic carboxylic acid, or an anhydride, ester, or a salt thereof. Suitable examples include, maleic acid, fumaric acid, (meth)acrylic acid, itaconic acid, cinnamic acid, and anhydrides, esters, or salts thereof. The amount of modified polypropylene may vary widely, but for economical reasons the amount will normally be rather low, such as 5% or less by total weight of the composition, preferably 4% or less, such as 3% or less, 2%. The amount of such modified polypropylene is at least 1 wt. %

The polypropylene composition of the invention further comprises 5-25% by total weight of the composition of one or more plastomers. A plastomer is an ethylene/α-olefin copolymer, which is typically thermoplastic. The plastomer is a separate component in the polypropylene composition of the invention and is not comprised in the polymer blend. Sometimes the elastomeric phase of the polymer blend (or the dispersed phase of the heterophasic propylene copolymer) is termed "internal elastomer" whereas an additional plastomer is termed "external elastomer".

The plastomers used in the polypropylene composition of this invention preferably comprise ethylene and at least one α-olefin, preferably a $C_{3-40}$ α-olefin, more preferably a $C_{3-18}$ α-olefin, and even more preferably a $C_{3-12}$ α-olefin or a $C_{4-12}$ α-olefin. Particularly preferred examples thereof include butane, pentene, hexane and octane. The α-olefin comonomer may be present at 10-42% by total weight of the plastomer, preferably 20-40%, such as 30-38%. Suitably, the plastomer can have a density in the range of 0.86-0.90 g/cm³, such as in the range of 0.86-0.88 g/cm³. An excessive amount of the plastomer is preferably avoided so that the desirable strength properties of the polypropylene composition are not adversely affected thereby. Preferably, the plastomer is used in an amount of 5-20% by total weight of the polypropylene composition, more preferably 5-15%. The plastomer preferably has a melt flow index of 0.5-40 g/10 min (190° C., 2.16 kg), more preferably 1-20 g/10 min, such as 2-10 g/10 min.

Suitably, the one or more plastomers are different from the elastomer in the polymer blend. Preferably, the plastomers are not cross-linked.

Preferably, the one or more plastomers are selected from the group consisting of metallocene-catalysed polyethylene-based copolymers and metallocene-catalysed polyethylene-based terpolymers. A description of plastomers and in particular of metallocene plastomers as well as an overview of their mechanical and physical properties can be found for instance in Chapter 7.2 of "Handbook of polypropylene and polypropylene composites" edited by Harutun G. Karian (ISBN 0-8247-4064-5) and more in particular in subchapters 7.2.1; 7.2.2; and 7.2.5 to 7.2.7 thereof, which are herewith completely incorporated by reference. For completeness' sake, it is to be noted that the materials identified as elastomer and as plastomers in this reference, are all included in the term "plastomer" as used in the context of the this invention.

Metallocene-catalysed polyethylene-based copolymers are polymers formed by the metallocene catalysed polymerisation of primarily ethylene with lesser amounts of a second monomer, typically an α-olefin such as butane, desirably hexane or octane. The second monomer may be present in the polymer in an amount of 10-42% by total weight of the polymer, preferably 20-40%, such as 30-38%. The metallocene-catalysed polyethylene-based copolymer plastomers preferably have a density of 0.86-0.91 g/cm³, preferably 0.86-0.88 g/cm³, more preferably 0.86-0.88 g/cm³. The metallocene-catalysed polyethylene-based copolymer plastomers preferably have a melt flow index of 0.5-30 g/10 min with a 2.16 kg load at 190° C., preferably 1-20 g/10 min, more preferably 2-10 g/10 min. Examples of commercially available metallocene-catalysed polyethylene-based copolymers include Exact® plastomers which are commercially available from Exxon Mobile Corporation and Engage® and Affinity® polyolefin plastomers which are commercially available from Dow Elastomers, and Tafmer® plastomers which are commercially available from Mitsui.

Another way of describing the polypropylene composition of the invention is by sorting the matrix phase and the dispersed phase, since the plastomers together with the elastomer part of the polymer blend will become part of the dispersed phase. Accordingly, the invention may further be described as a polypropylene composition comprising 20-86% by total weight of the composition of a crystalline polypropylene-based matrix phase, preferably 22-68%, said matrix phase comprising polypropylene having a melt flow index as measured according to ISO 1133 at 230° C. and 2.16 kg of 2.0-100 g/10 min;

7-70% by total weight of the composition of an ethylene/α-olefin copolymer dispersed phase, preferably 12-48%;

0.5-25% by total weight of the composition of a mineral filler selected from the group consisting of phyllosilicates, mica or wollastonite; and 0.2-4% by total weight of the composition of glass fibres having an average fibre diameter in the range of 5-30 µm, preferably 10-25 µm. The crystalline polypropylene-based matrix phase in this definition is described above. The ethylene/α-olefin copolymer dispersed phase in this definition is formed by the combined ethylene/α-olefin elastomeric copolymer of the polymer blend and ethylene/α-olefin copolymer plastomer, both of which are described above.

As a further component, the polypropylene composition of the invention comprises 0.5-25% by total weight of the composition of mineral filler. It is preferred that the mineral filler is an anisotropic mineral filler.

In principle, the mineral filler can have any particle size and size distribution. The mineral filler can, for example, have a $d_{50}$ median particle size of 0.5-8 µm when measured on uncompacted material according to ISO 13317-3 using a Sedigraph (50% or more by weight of the mineral filler has a particle size of 0.5-8 µm). For instance, the $d_{50}$ median particle size can be 0.8-5 µm, 1.0-4 µm, or 1.2-3 µm. However, mineral fillers that have a coarser particle size distribution can also be used. Thus, the mineral filler may also have a $d_{50}$ median particle size of 3-50 µm, such as 4-40 µm, or 5-30 µm.

While the BET nitrogen surface area of the mineral filler is not particularly limiting, in an embodiment the mineral filler has a BET nitrogen surface area as measured according to DIN 66131-2 of 8-25 m²/g, preferably 9-22 m²/g, more preferably 10-20 m²/g. However, mineral fillers with other BET nitrogen surface areas can also be employed in the invention.

In principle, any type of mineral filler can be used having the above described properties. The mineral filler is selected from the group consisting of phyllosilicates, mica or wollastonite. More preferably, the mineral filler is selected from the group consisting of mica, wollastonite, kaolinite, smectite, montmorillonite, and talc. The most preferred mineral filler is talc. Talc is a mineral composed of hydrated magnesium silicate and may comprise low amounts of residues, like iron oxide (FeO; $Fe_2O_3$) and/or iron silicate. Generally the amounts of residues do not exceed 5.0% by weight of the talc. Thus, it is preferred that the talc comprise 0.1-3.5% by weight of the talc of residues (i.e. residues comprising iron, like iron oxide or iron silicate), more preferably 0.1-3.0%. Of course, talc may also be a chlorite-talc.

Preferably, the talc is of the above defined medium fineness. Finer talc leads to agglomerates and therefore to a deteriorated distribution of the talc when blending the polypropylene composition. Coarser talc leads to a decrease in the mechanical performance of the polypropylene composition. All kinds of talc may be used in accordance with the invention.

Typical examples of commercially available talc products are Luzenac® A7C, Steamic® T1CA, Jetfine® 3CA, and HAR (high aspect ratio) talc, all commercially available from Imerys Talc.

Suitably, the amount of the mineral filler in the polypropylene composition of the invention can be 5-20% by total weight of the composition, such as 5-17%, 5-16%, or 10-20% by total weight of the composition.

The mineral filler may be included during or after the polymerisation process of the polymers used for the polymer blend. Usually the mineral filler is added to the polypropylene composition after the polymerisation process.

Additionally, the polypropylene composition of the invention comprises (before compounding) 0.2-4% by total weight of the composition of glass fibres having an average fibre diameter in the range of 5-30 µm, such as 10-25 µm. Very thick fibres may result in a decrease of mechanical properties and/or lower surface quality. The distribution of fibre diameters is preferably such that at least 95% of the glass fibres in the composition have a fibre diameter in the range of 5-30 µm, such as in the range of 10-25 µm. More preferably, at least 98% of the fibres have a fibre diameter in the range of 5-30 µm, such as in the range of 10-25 µm.

Preferably, the glass fibres are chopped glass fibres. Such glass fibres are typically made by mixing chopped strands of pre-determined length with a thermoplastic polymer in an extruder, during which the glass fibres are dispersed in the molten thermoplastic. Before compounding, the glass fibres can have an average fibre length of 1-10 mm, preferably 2-8 mm, more preferably 3-7 mm. The distribution of fibre lengths is preferably such that at least 95% of the glass fibres in the composition have a fibre length in the range of 1-10 mm, such as in the range of 2-8 mm, or 3-7 mm. More preferably, at least 98% of the glass fibres in the composition have a fibre length in the range of 1-10 mm, such as in the range of 2-8 mm, or 3-7 mm.

Generally, the length of glass fibres in a polymer composition decreases during a melt processing step like injection moulding. The average length of the glass fibres in the moulded article made from the composition according to the invention, i.e. after compounding, is therefore typically significantly shorter. Preferably, the average fibre length in the moulded article (after compounding) can be from 0.05-0.9 mm, more preferably 0.1-0.6 mm, even more preferably 0.1-0.4 mm. The distribution of fibre lengths is then preferably such that at least 95% of the glass fibres in the composition have a fibre length in the range of 0.05-0.9 mm, such as in the range of 0.1-0.6 mm, or 0.1-0.4 mm. More preferably, at least 98% of the glass fibres in the composition have a fibre length in the range of 0.05-0.9 mm, such as in the range of 0.1-0.6 mm, or 0.1-0.4 mm. The average glass fibre diameter is in the range of 5-30 µm, preferably 10-25 µm, also after compounding. The average glass fibre diameter does not substantially change upon compounding.

Suitably, the glass fibres can be coated in order to improve the interaction with the polypropylene. Such coated glass fibres are also known in the art as sized glass fibres. Such coatings typically include amino-silane or silane coatings. Amino-silane and silane coated glass fibres are commercially available. Some examples include ECS03-480H (from NEG), 03T480 (from NEG), HP3270 (from PPG Industries), HP3299 (from PPG Industries), ECS 305H (from CPIC), ECS 305K (from CPIC)

The glass fibers may be treated with a coupling agent so as to improve the interaction between the glass fibres and the polypropylene. Such coupling agents facilitate adhesion of the polypropylene to the polar glass fibre surface. Suitable coupling agents include functional organo silanes, transition metal coupling agents, amino containing Werner coupling agents and mixtures thereof. Examples of functional organo silane coupling agents include 3-aminopropyldimethylethoxysilane, γ-aminopropyltriethoxysilane, γ-aminopropyltrimethoxysilane, β-aminoethyltriethoxysilane, N-β-aminoethylamino-propyltrimethoxysilane, γ-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane. Examples of transition metal coupling agents include chrome, titanium and zirconium coupling agents. Examples of amino-containing Werner type coupling agents include complex compounds in which a trivalent nuclear atom such as chromium is coordinated with an organic acid having amino functionality. Such treated glass fibres are known in the art.

The amount of glass fibres in the composition is important for obtaining the combination of improved shrinkage properties and the increased heat deflection temperature. The inventors surprisingly found that the combination of these desirable properties can be obtained when the amount of glass fibres used is relatively small. Accordingly, the polypropylene composition of the invention comprises (before compounding) 0.2-4% by total weight of the composition of glass fibres having an average fibre diameter in the range of 5-30 µm, preferably 0.3-3.5%, more preferably 0.5-3%, such as 1-2%.

The polypropylene composition further preferably comprises at least one adhesion promoter. A preferred adhesion promoter is a maleic anhydride functionalised polypropylene. A commercially available example for a suitable adhesion promoter is Exxelor® PO1020 obtainable from ExxonMobil Chemical. The amount of adhesion promoter depends on the amount of glass fibre and preferably ranges from 0.03 times the amount of glass fibre in the composition to 0.10 times the amount of glass fibre in the composition. Thus, when 20% by total weight of the polypropylene composition of glass fibres are used, the adhesive promoter will be preferably used in an amount of 0.6-2.0% by total weight of the polypropylene composition. When 40% by total weight of the polypropylene composition of glass fibres are used, the adhesive promoter will be preferably used in an amount of 1.2-4.0% by total weight of the polypropylene composition.

As optional components, the polypropylene composition of the invention can further comprise additives in an amount of up to 4% by total weight of the polypropylene composition, preferably 0.1-3.7%, more preferably 0.5-3.5%. These additives may be included during the polymerisation process of the polymers used for obtaining the polymer blend and/or they may be added to the polypropylene composition before, during or after blending. Suitable additives for the polypropylene composition of the invention include miscible thermoplastics, antioxidants, stabilisers (including hindered amine light stabilisers), UV stabilisers, acid scavengers, antistatic agents, lubricants, demoulding agents, slip agents, nucleating agents, fillers, colouring agents, foaming agents, anti-scratch agents, and pigments (including carbon black).

The polypropylene composition of the invention preferably has a melt flow index as measured according to ISO 1133 using a 2.16 kg weight and at a temperature of 230° C. of 0.1-100 g/10 min, preferably of 10-40 g/10 min.

The heat deflection temperature as measured according to ISO 75B of the polypropylene composition of the invention is preferably 105° C. or more, preferably 110° C. or more, such as 110-125° C. Heat deflection temperature was measured according to ISO 75-2 (method B/045 MPa). Specimen of dimensions 80×10×4 mm were measured flatwise using injection moulded test specimens as described in EN ISO 1873-2 (80×10×4 mm).

Suitably, the polypropylene composition of the invention exhibits an average shrinkage measured according to ISO 294-4 on 65×65×3.2 mm injection moulded plaques of 1.05% or less, preferably 0.95% or less, more preferably 0.85% or less.

A preferred polypropylene composition of the invention has a flexural strength as measured according to ISO 178 of 25 N/mm$^2$ or more, preferably 28-35 N/mm$^2$.

A preferred polypropylene composition of the invention further exhibits a tensile modulus as measured according to ISO 527-1A of 1500 N/mm$^2$ or more, preferably 1550-1900 N/mm$^2$.

The composition according to the invention can be made with known processes, for example by mixing all components in an extruder, to obtain the composition in pellet or granule form. The composition can also be made by blending different pellets of different compositions.

In a further aspect, the invention is directed to a three-dimensional article comprising a polypropylene composition according to the invention, preferably a moulded three-dimensional article such as an injection-moulded three-dimensional article. As mentioned hereinabove, the average glass fibre length in the three-dimensional article is significantly shorter than the average glass fibre length in the original composition as a result of melt processing. Typically, the average glass fibre length in the three-dimensional article is 0.05-0.9 mm, more preferably 0.1-0.6 mm, even more preferably 0.1-0.4 mm.

Preferably, the three-dimensional article is in the form of an automotive article.

The three-dimensional article according to the invention can be a semi-finished or finished article made from the polypropylene composition by a moulding process. Examples of suitable moulding processes include injection moulding, compression moulding, extrusion and extrusion compression moulding. Injection moulding is most widely used to produce articles such as automotive parts. A semi-finished article may subsequently undergo further known processing steps.

In yet a further aspect the invention is directed to the use of a composition according to the invention for automotive articles.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

TEST METHODS

Melt Flow Index

The melt flow index was measured according to ISO 1133 with a load of 2.16 kg at 230° C.

Heat Deflection Temperature

Heat deflection temperature was measured according to ISO 75-2 (method B/045 MPa). Specimen of dimensions 80×10×4 mm were measured flatwise using injection moulded test speciments as described in EN ISO 1873-2 (80×10×4 mm).

Flexural Modulus

Flexural modulus was measured according to ISO 178 at 23° C., using injection moulded test specimens as described in EN ISO 1873-2 (80×10×4 mm).

Charpy Notched Impact Strength

Charpy notched impact strength was determined according to ISO 179-1eA:2000 on V-notched samples of 80×10×4 mm at 23° C. and −20° C.

The test specimens were prepared by injection moulding according to ISO 1873-2.

Density

Density was determined according to ISO 1183.

Shrinkage

Mould shrinkage, in the context of this invention called shrinkage, is the amount of contraction that a moulded part undergoes when it is removed from the mould cavity and cooled at room temperature. Shrinkage was measured according to ISO 294-4 on 65×65×3.2 mm injection moulded plaques after a conditioning time of 24 h after moulding at room temperature (23° C.) and 50% relative humidity. Each of the samples was moulded using the same conditions at the moulding machine. Shrinkage measured in the flow length and perpendicular to the flow is reported here. Following equation was used to determine shrinkage:

$$\frac{L_m - L_s}{L_m} \times 100 = \text{shrinkage [\%]}$$

wherein $L_m$ is the length of the mould in the considered direction, and $L_s$ is the length of the specimen in considered direction. A shrinkage in the flow direction, a shrinkage in the perpendicular direction to flow direction, as well as an average (arithmetic) of both shrinkage values is reported.

EXAMPLES

Polypropylene compositions as defined in table 1 were prepared by blending the different ingredients listed in table 2 using the ingredients mentioned in table 1.

TABLE 1

|  | Tradename | Description | Producer |
|---|---|---|---|
| Polymer A | C7100-50 | Propylene polymer; MFI 50 dg/min | Braskem |
| Polymer B | TI2600C | Propylene polymer; MFI 60 dg/min | Braskem |
| Plastomer 1 | Tafmer A-0550S | $C_2C_4$ impact modifier; MFI 0.5 dg/min, density 860 kg/m$^3$ | Mitsui |
| Plastomer 2 | Engage 8200 | $C_2C_8$ impact modifier; MFI 5 dg/min, density 870 kg/m$^3$ | Dow |
| Filler Luzenac HAR T84 | HAR T84 | Talcum with D10 of about 10 μm | Luzenac |
| NEG ECS03-480 glass fibre | ECS03 T-480 | E-glass chopped strand 10 μm | NEG |
| Irganox 1076 | Irganox 1076 | Antioxidant | BASF |
| Irganox B225 | Irganox B225 | Stabiliser | BASF |
| CA FDA Fusabond | Fusabond P613 | Anhydride modified polypropylene | Dupont |
| Stab NA-11 UH | ADK STAB NA-11UH | Nucleating agent | Adeka (Palmerole) |
| Crodamide ER | Crodamide | Slip agent | Croda |
| Chimassorb 944 | Chimassorb 944 | Hindered amine light stabiliser | BASF |
| Masterbatch CMB | Plasblak PE 4884 | Masterbatch | CABOT |

TABLE 2

|  | Sample 1 (wt. %) | Sample 2 (wt. %) |
|---|---|---|
| Polymer A | 53.6 | 52.6 |
| Polymer B | 10 | 10 |
| Plastomer | 16 | 16 |
| Filler | 16 | 16 |
| Irganox 1010 | 0.1 | 0.1 |
| Irganox 1076 | 0.1 | 0.1 |
| Irgafos 168 | 0.1 | 0.1 |
| Exxelor PO 1020 | 0.2 | 0.2 |
| NEG ECS glass fibre |  | 1 |
| Crodamide EBSH | 0.1 | 0.1 |
| Crodamide ER | 0.6 | 0.6 |
| Chimasorb 944 | 0.2 | 0.2 |
| Masterbatch CMB | 3 | 3 |
| Total | 100 | 100 |

TABLE 3

|  | Sample 1 (wt. %) | Sample 2 (wt. %) |
|---|---|---|
| Flexural ISO 178 (T = 23° C., II), 7 days [N/mm$^2$] | 1934 | 1977 |
| Flexural strength [N/mm$^2$] | 33.1 | 33.7 |
| Tensile ISO 527-1A (T = 23° C., II), 7 days [N/mm$^2$] | 1803 | 1858 |
| HDT B ISO 75-b [° C.] | 108.3 | 115.1 |
| Shrinkage 3D measurement ISO 294-4 |  |  |
| Average shrinkage after 24 hrs at 23° C. [%] | 0.97 | 0.86 |
| Shrinkage parallel to flow after 24 hrs at 23° C. [%] | 0.9 | 0.83 |
| Shrinkage perpendicular to flow after 24 hrs at 23° C. [%] | 1.03 | 0.89 |

TABLE 4

|  | Sample 3 (wt. %) | Sample 4 (wt. %) | Sample 5 (wt. %) | Sample 6 (wt. %) | Sample 7 (wt. %) | Sample 8 (wt. %) |
|---|---|---|---|---|---|---|
| Polymer A | 30 | 30 | 30 | 30 | 30 | 30 |
| Polymer B | 37.95 | 37.85 | 37.75 | 37.65 | 35.65 | 35.75 |
| Plastomer 1 | 12 | 12 | 12 | 12 | 14 | 14 |
| Plastomer 2 | 6 | 6 | 6 | 6 | 6 | 6 |
| Filler Luzenac HAR T84 | 11 | 10 | 9 | 8 | 8 | 9 |
| NEG ECS03-480 glass fibre |  | 1 | 2 | 3 | 3 | 2 |
| Irganox 1076 | 0.1 | 0.1 | 0.1 | 0.1 | 0.1 | 0.1 |
| Irganox B225 | 0.2 | 0.2 | 0.2 | 0.2 | 0.2 | 0.2 |
| CA FDA Fusabond |  | 0.1 | 0.2 | 0.3 | 0.3 | 0.2 |
| Stab NA-11 UH | 0.15 | 0.15 | 0.15 | 0.15 | 0.15 | 0.15 |
| Crodamide ER | 0.5 | 0.5 | 0.5 | 0.5 | 0.5 | 0.5 |
| Chimasorb 944 | 0.1 | 0.1 | 0.1 | 0.1 | 0.1 | 0.1 |
| Masterbatch CMB | 2 | 2 | 2 | 2 | 2 | 2 |
| Total | 100 | 100 | 100 | 100 | 100 | 100 |

TABLE 5

|  | Sample 3 (wt. %) | Sample 4 (wt. %) | Sample 5 (wt. %) | Sample 6 (wt. %) | Sample 7 (wt. %) | Sample 8 (wt. %) |
|---|---|---|---|---|---|---|
| HDT B ISO 75-B [° C.] | 88.9 | 114.1 | 106.6 | 117.2 | 121.3 | 118.8 |
| Shrinkage 3D measurement ISO 294-4 |  |  |  |  |  |  |
| Average shrinkage after 24 hrs at 23° C. [%] | 0.87 | 0.74 | 0.73 | 0.72 | 0.55 | 0.62 |
| Shrinkage parallel to flow after 24 hrs at 23° C. [%] | 0.76 | 0.59 | 0.58 | 0.54 | 0.36 | 0.44 |

TABLE 5-continued

| | Sample 3 (wt. %) | Sample 4 (wt. %) | Sample 5 (wt. %) | Sample 6 (wt. %) | Sample 7 (wt. %) | Sample 8 (wt. %) |
|---|---|---|---|---|---|---|
| Shrinkage perpendicular to flow after 24 hrs at 23° C. [%] | 0.99 | 0.89 | 0.88 | 0.89 | 0.75 | 0.80 |

The invention claimed is:

1. Polypropylene composition comprising:
   40-90% by total weight of the composition of a polymer blend comprising polypropylene having a melt flow index as measured according to ISO 1133 at 230° C. and 2.16 kg of 2.0-100 g/10 min;
   5-25% by total weight of the composition of one or more plastomers;
   0.5-25% by total weight of the composition of mineral filler selected from the group consisting of phyllosilicates, mica, and wollastonite; and
   0.2-4% by total weight of the composition of glass fibres having an average fibre diameter in the range of 5-30 μm.

2. Polypropylene composition according to claim 1, comprising:
   50-80% by total weight of the composition of the polymer blend;
   7-20% by total weight of the composition of the one or more plastomers;
   1-20% by total weight of the composition of the mineral filler; and
   0.5-3% by total weight of the composition of the glass fibres.

3. Polypropylene composition according to claim 1, comprising:
   60-75% by total weight of the composition of the polymer blend;
   10-20% by total weight of the composition of the one or more plastomers;
   2-15% by total weight of the composition of phyllosilicate mineral filler, wherein the phyllosilicate mineral filler comprises a talc mineral filler; and
   0.5-2.5% by total weight of the composition of the glass fibres.

4. Polypropylene composition according to claim 1, wherein said polypropylene is a modified polypropylene.

5. Polypropylene composition according to claim 4, wherein said modified polypropylene is a polypropylene grafted with an unsaturated organic carboxylic acid, or an anhydride, ester, or a salt thereof.

6. Polypropylene composition according to claim 4, wherein said modified polypropylene is a polypropylene grafted with maleic acid, fumaric acid, (meth)acrylic acid, itaconic acid or cinnamic acid, or anhydrides, esters or salts thereof.

7. Polypropylene composition comprising:
   20-86% by total weight of the composition of a crystalline polypropylene-based matrix phase, said matrix phase comprising polypropylene having a melt flow index as measured according to ISO 1133 at 230° C. and 2.16 kg of 2.0-100 g/10 min;
   7-70% by total weight of the composition of an ethylene/α-olefin copolymer dispersed phase;
   0.5-25% by total weight of the composition of a mineral filler selected from the group consisting of phyllosilicates, mica, and wollastonite; and
   0.2-4% by total weight of the composition of glass fibres having an average fibre diameter in the range of 5-30 μm.

8. Polypropylene composition according to claim 7, comprising:
   22-68% by total weight of the composition of the crystalline polypropylene-based matrix phase;
   12-48% by total weight of the composition of the ethylene/α-olefin copolymer dispersed phase;
   1-20% by total weight of the composition of the mineral filler; and
   0.5-3% by total weight of the composition of the glass fibres.

9. Polypropylene composition according to claim 1,
   wherein the glass fibres have an average fibre diameter of 10-25 μm; and/or
   wherein, when the polypropylene composition is compounded, the glass fibres have an average fibre length before compounding of 1-10 mm; and/or
   wherein when the polypropylene composition is compounded, the glass fibres have an average fibre length after compounding of 0.05-0.9 mm.

10. Polypropylene composition according to claim 1, wherein the glass fibres have been treated with a coupling agent, wherein the coupling agent is selected from the group consisting of functional organosilanes, transition metal coupling agents, amino-containing Werner coupling agents and mixtures thereof.

11. Polypropylene composition according to claim 1, wherein the composition has a melt flow index as measured according to ISO 1133 using a 2.16 kg weight and at a temperature of 230° C. of 0.1-100 g/10 min.

12. Polypropylene composition according to claim 1, wherein the mineral filler is selected from the group consisting of mica, wollastonite, kaolinite, smectite, montmorillonite and talc, wherein the kaolinite, the smectite, the montmorillonite and the talc, are phyllosilicates.

13. Polypropylene composition according to claim 1, wherein said composition has a heat deflection temperature as measured according to ISO 75B of 105° C. or more.

14. Polypropylene composition according to claim 1, wherein said composition exhibits an average shrinkage measured according to ISO 294-4 on 65×65×3.2 mm injection moulded plaques of 1.05% or less.

15. Polypropylene composition according to claim 1, wherein said composition has a flexural strength as measured according to ISO 178 of 25 N/mm$^2$ or more.

16. Three-dimensional article comprising the polypropylene composition according to claim 1.

17. Three-dimensional article according to claim 16, wherein the three-dimensional article is in the form of an automotive article.

18. Polypropylene composition according to claim 7, wherein the melt flow index of the polypropylene matrix phase, as measured according to ISO 1133 at 230° C. and 2.16 kg is 15-100 g/10 min.

* * * * *